United States Patent [19]

Baird

[11] 4,202,028
[45] May 6, 1980

[54] GROUND AND TEST APPARATUS WITH INDICIA MEANS

[75] Inventor: Leslie L. Baird, West Burlington, Iowa

[73] Assignee: General Electric Company, Philadelphia, Pa.

[21] Appl. No.: 963,863

[22] Filed: Nov. 27, 1978

[51] Int. Cl.² ............................................. H02B 1/04
[52] U.S. Cl. .............................. 361/343; 200/50 AA; 361/339
[58] Field of Search .......................... 200/50 AA, 308; 361/334–339, 341–345

[56] References Cited

U.S. PATENT DOCUMENTS

| | | | |
|---|---|---|---|
| 2,237,367 | 4/1941 | Scott, Jr. | 361/337 |
| 2,600,304 | 6/1952 | Krida | 361/343 |
| 3,130,352 | 4/1964 | Guinan | 361/336 |
| 3,440,371 | 4/1969 | Netzel et al. | 361/337 |

*Primary Examiner*—Gerald P. Tolin
*Attorney, Agent, or Firm*—William Freedman; Carl L. Silverman

[57] ABSTRACT

A ground and test apparatus is provided for use in combination with switchgear apparatus of the type which includes upper and lower circuit breaker compartments. The switchgear contacts in each of the compartments are disposed in a reverse order such that bus-side contacts are adjacent the lower portion in the upper compartment and adjacent the upper portion in the lower compartment. Similarly, line or load side contacts are adjacent the upper portion in the upper compartment and adjacent the lower portion in the lower compartment. The ground and test apparatus is of a configuration suitable for insertion into the upper or lower compartments and includes indicia means for visually indicating the proper location of the bus-side and line or load side contacts in the upper or lower compartments. The ground and test apparatus includes inhibiting means coupled to the indicia means for physically inhibiting the insertion of the ground and test apparatus into the upper or lower compartments when the indicia means visually indicates an improper location of the bus-side and line or load side contacts. In a preferred form of ground and test apparatus, the inhibiting means includes a pair of bars disposed such that when one bar is up, the other bar is down. The two bars coact with a coded plate in the switchgear apparatus such that the down bar engages the coded plate and inhibits the insertion of the ground and test apparatus into either of the compartments when the indicia means visually indicates an improper location of the bus-side and line or load side contacts in the compartment.

11 Claims, 11 Drawing Figures

GROUND AND TEST APPARATUS WITH INDICIA MEANS

BACKGROUND OF THE INVENTION

This invention relates to a ground and test apparatus for use in combination with switchgear apparatus having upper and lower circuit breaker compartments which respectively include bus and line or load side contacts having reverse vertical positions, and more particularly to such a ground and test apparatus including indicia means for indicating the proper location of the bus and line or load side switchgear contacts in the upper and lower switchgear compartments.

A simple switchgear equipment design includes upper and lower circuit breaker compartments electrically connected to a common bus which is centrally positioned between the upper and lower circuit breaker compartments. In this switchgear equipment configuration, the line or load and bus switchgear contacts in the upper and lower compartments are reversed. That is, generally, the upper compartment has switchgear bus contacts on the bottom and switchgear line or load contacts on the top while the lower switchgear compartment has switchgear bus contacts on the top and switchgear line or load contacts on the bottom.

The relative vertical reversal of switchgear contacts in the upper and lower switchgear compartments may cause problems when one employs a ground and test apparatus for use on a circuit(s) protected by the upper or lower circuit breaker. More particularly, when work is being performed on a power circuit, the protective circuit breaker is generally removed from the circuit breaker compartment and replaced with a ground and test apparatus. The ground and test apparatus is inserted into the breaker compartment and grounding leads are connected between the switchgear contacts of a power circuit(s) which is to be grounded and a ground bus on the ground and test apparatus. If an error is made in the grounding connection, a line, or bus, circuit may be inadvertently short circuited. Such an error can lead to a dangerous condition.

Accordingly, it is a general object of my invention to provide a ground and test apparatus for use in combination with switchgear apparatus having upper and lower circuit breaker compartments with reverse position bus side and line or load side switchgear contacts wherein the ground and test apparatus includes indicia means for visually indicating the proper location of the bus and line or load side contacts.

Another object of my invention is to provide such a ground and test apparatus which includes inhibiting means for inhibiting the insertion of the ground and test apparatus into one of the switchgear compartments when the indicia means visually indicates the improper location of the switchgear bus and line or load side contacts.

SUMMARY

In carrying out one form of my invention, I provide a ground and test apparatus for use in combination with switchgear apparatus wherein the switchgear apparatus includes an upper circuit breaker compartment and a lower circuit breaker compartment. Each of the compartments includes at least one pair of vertically spaced-apart electrical switchgear contacts with one of the pair of switchgear contacts comprising a bus-side contact and the other of the pair of contacts comprising a line or load side contact. The pairs of switchgear contacts in the upper and lower compartments are substantially identically disposed along a common vertical axis except the relative vertical position of the bus-side contact and the line or load side contact in the upper and lower compartments is reversed. The ground and test apparatus includes a housing having spaced-apart front and rear sides and being of a configuration suitable for insertion into the upper or lower compartments of the switchgear apparatus with the rear side facing the pair of electrical contacts of the upper or lower compartments of the switchgear apparatus. At least one pair of vertically spaced-apart housing electrical conductors extend at least partially between the front and rear sides of the housing with the pair of housing conductors being spaced-apart in substantially the same manner as the spaced-apart electrical switchgear contacts of the switchgear apparatus. At least one member of the pair of housing conductors at the rear side of the housing is adapted so that when the housing is fully inserted into one of the compartments, the conductor is electrically connected to a predetermined member of the pair of switchgear contacts of the upper or lower compartment of the switchgear apparatus and the one member of the pair of housing conductors is physically accessible at the front side of the housing. Indicia means is located at the front side of the housing for visually indicating the proper relative vertical location of the bus-side and line or load side electrical switchgear contacts in the upper or lower compartments. Inhibiting means is coupled to the indicia means for physically inhibiting the full insertion of the housing into the upper or lower compartments when the indicia means visually indicates an improper relative vertical location of the bus-side and line or load side electrical switchgear contacts in the upper and lower compartments. The inhibiting means permits the full insertion of the housing into the upper or lower compartments when the indicia means visually indicates the proper relative vertical location of the bus-side and line or load side switchgear contacts.

DETAILED DESCRIPTION OF PREFERRED EMBODIMENTS

Figure 1:
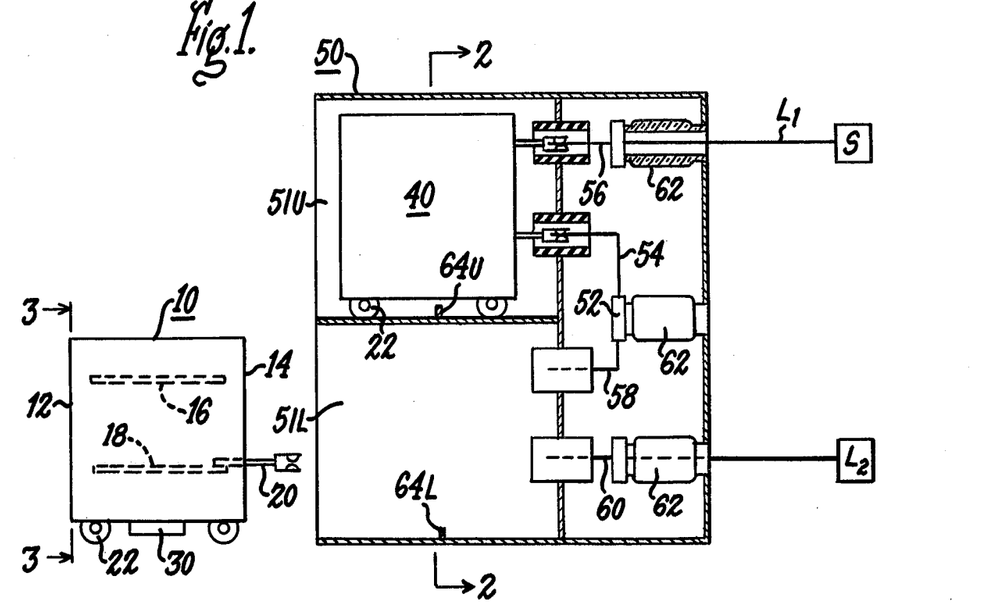
FIG. 1 is a side elevational schematic view showing one form of ground and test apparatus of the present invention in combination with an exemplary two compartment switchgear apparatus.

Referring initially to FIG. 1, one form of ground and test apparatus of the present invention, generally designated 10, is shown in combination with exemplary two-compartment switchgear apparatus, generally designated 50.

The ground and test apparatus 10 includes a housing having a front side 12 and a rear side 14. At least one pair of vertically spaced-apart housing conductors 16, 18 extend at least partially between the front and rear sides 12 and 14. As shown in FIG. 1, a connection bar 20 is removably secured to the lower housing conductor 18 at the rear side 14 of the housing. The ground and test apparatus 10 includes motion means, e.g., wheels 22, for use in horizontally moving the apparatus 10.

The two compartment switchgear apparatus 50 includes upper and lower circuit breaker compartments 51U, 51L respectively. In FIG. 1, upper circuit breaker compartment 51U is shown with a circuit breaker 40 in operating position as a main breaker fed from source S and protecting the switchgear including the bus 52. Lower circuit breaker compartment 51L is shown with its circuit breaker for protecting load $L_2$ removed and the ground and test apparatus 10 ready to be fully inserted therein.

Figure 2:
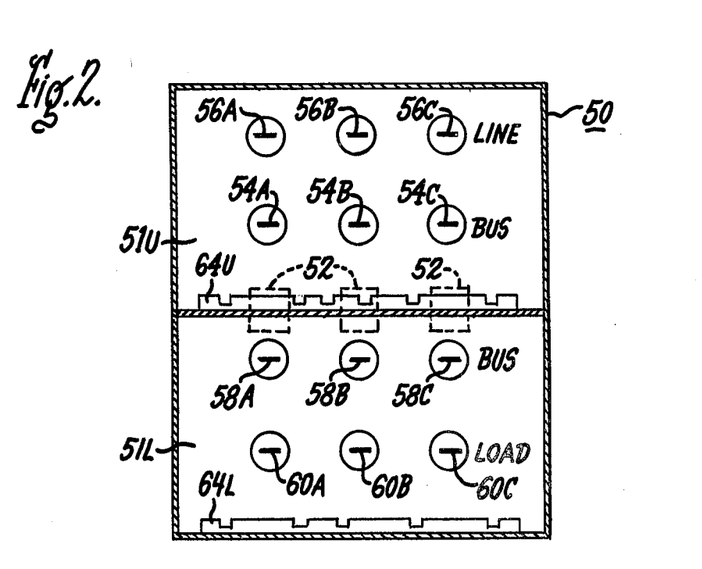
FIG. 2 is a front elevational view taken along line 2—2 of FIG. 1.

The outgoing circuits of the switchgear apparatus 50 are electrically fed by the centrally positioned bus 52 with the bus-side switchgear contact 54 being adjacent the bottom side of upper compartment 51U and the bus-side switchgear contact 58 being adjacent the upper side of the lower switchgear compartment 51L. The line-side switchgear contact 56 is adjacent the top side in the upper switchgear compartment 51U while the load side switchgear contact 60 is adjacent the bottom side of lower switchgear compartment 51L. The switchgear contacts (54–56, 58–60, 52) are electrically insulated through conventional insulators 62. The reversal of the switchgear bus and line or load contacts (54, 58, and 56, 60) in the upper and lower switchgear compartments 51U, 51L can be better appreciated by referring to FIGS. 1 and 2. FIG. 2 illustrates the relative positions of switchgear bus and line or load contacts for a typical three phase switchgear apparatus where, for example, instead of a single pair of vertically spaced bus-side switchgear contact 54 and line or load side switchgear contact 56 in the upper compartment 51U, three such pairs of bus side and line or load side switchgear contacts are provided. These three such pairs of switchgear contacts are identified in FIG. 2 with the further designation A, B, C.

The switchgear apparatus 50 typically includes separate rating interference plates 64U, 64L, respectively provided in each of the upper and lower switchgear compartments 51U, 51L to cooperate with mating interference plates on each circuit breaker 40 employed. Such rating interference plates 64U, 64L are used primarily to prevent insertion of a circuit breaker of a given rating into one of the switchgear compartments having a different rating. Typically, the rating interference plates 64U, 64L include a number of teeth which are either present or missing, coded to indicate voltage, continuous current, short circuit current, and close and latch rating. Also, typically one of the teeth indicates the upper switchgear compartment 51U and another indicates the lower switchgear compartment 51L.

Figure 3:
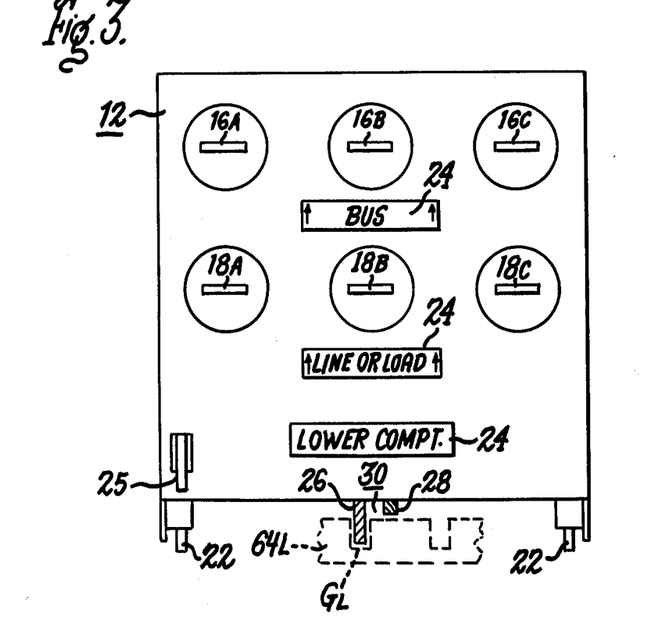
FIG. 3 is a front elevational view taken along line 3—3 of FIG. 1 showing the front side of the ground and test apparatus of FIG. 1 when the ground and test apparatus is about to be inserted into the lower switchgear compartment.
Figure 4:
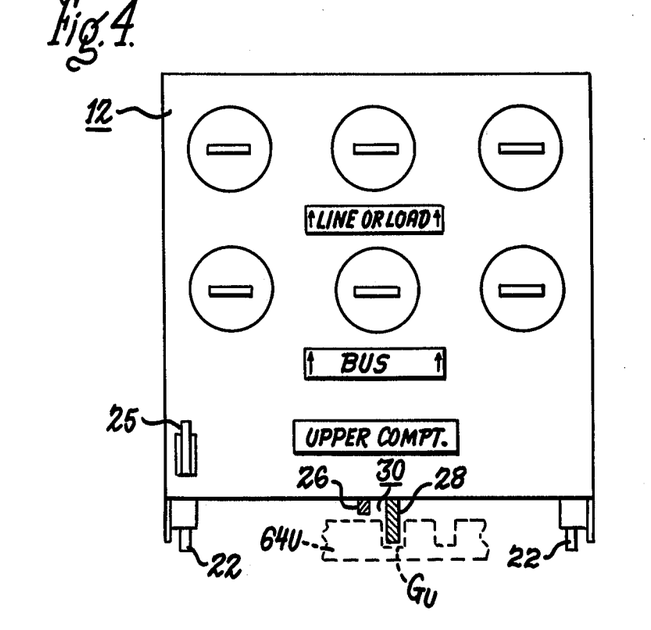
FIG. 4 is a front elevational view, taken as in FIG. 3, showing the front side of the ground and test apparatus of FIG. 1 when the ground and test apparatus is to be inserted into the upper switchgear compartment.

Referring now to FIGS. 3, 4, the front side 12 of the housing includes indicia means 24 which includes slots for visually indicating the proper location of the switchgear bus-side and line or load side contacts in the upper or lower switchgear compartments 51U, 51L. In FIG. 3, with an operating lever 25 in "DOWN" position, the indicia means 24 visually indicates that the ground and test apparatus 10 is set for the lower switchgear compartment 51L and the upper housing conductors 16A, B, C are aligned with the switchgear bus-side contacts 58A, B, C of FIG. 2. The indicia means 24 also visually indicates that the lower housing conductors 18A, B, C are aligned with the switchgear line or load side contacts 60A, B, C of FIG. 2. In FIG. 4, with the operating lever 25 in "UP" position, the indicia means 24 now visually indicates that the ground and test apparatus 10 is set for the upper switchgear compartment 51U with the upper housing conductors 16A, B, C in alignment with switchgear line or load side contacts 56A, B, C of FIG. 2. In FIG. 4, the indicia means 24 also indicates that the lower housing conductors 18A, B, C are in alignment with the switchgear bus-side contacts 54A, B, C of FIG. 2.

Referring again to FIGS. 1–3, when an operator wishes to ground line or load $L_2$ of FIG. 1, he may, before fully inserting the ground and test apparatus 10 into the lower switchgear compartment 51L, removably secure a connection bar 20 to each of the lower housing conductors 18A, B, C at the rear side 14 of the housing, as shown in FIG. 1. Note that, before inserting the ground and test apparatus 10 into the lower switchgear compartment 51L, the indicia means 24 properly indicates the position of bus side and line or load side switchgear contacts. In order to ensure good ground connection, the ground and test apparatus 10 is preferably provided with a ground bar to which grounding cables can be conveniently bolted. The ground bar in turn is typically connected by spring loaded contact fingers to the switchgear structure ground bus. Such a ground and test apparatus ground bar is shown as element 80 in FIG. 6.

Conversely, referring now to FIG. 4 in which the indicia means 24 visually indicates the position of the switchgear bus and line or load side contacts in the upper switchgear compartment 51U, note that, if the ground and test apparatus 10 were to be employed in the upper compartment 51U to test protected line or load L1 of FIG. 1, the operator would be properly advised as to the switchgear contact positions.

In addition to visually providing an operator with the proper location of the switchgear bus and line or load side contacts in the upper and lower switchgear compartments 51U, 51L, the ground and test apparatus 10 of the present invention also includes features for reducing the likelihood that an operator will fully insert the ground and test apparatus 10 into one of the switchgear compartments when the indicia means 24 improperly indicates the switchgear contact position in that particular switchgear compartment.

For example, the ground and test apparatus 10, and each of the switchgear compartments, 51U, 51L includes inhibiting means which coact to reduce the likelihood that an operator will improperly insert the ground and test apparatus 10 into the wrong switchgear compartment. More particularly, to provide this desirable inhibiting function, the ground and test apparatus 10 preferably includes movable inhibiting means 30 which coacts with stationary switchgear inhibiting means 64L, 64U disposed in each of the switchgear compartments 51L, 51U. In a preferred embodiment, as shown in FIGS. 3, 4, the ground and test apparatus movable inhibiting means 30 comprises a pair of bars 26, 28 which are disposed such that when one bar, e.g., bar 26, is down or extended, the other bar, e.g., bar 28, is up or retracted. The relative up-down position of bars 26, 28 is controlled by operating lever 25 through a linkage which will be discussed more fully later. Note that in FIG. 3, with the operating lever 25 "DOWN", bar 26 is down and bar 28 is up while in FIG. 4, with the operating lever 25 "UP", bar 26 is up and bar 28 down.

Now, referring again to FIG. 3, note that a portion of the stationary switchgear inhibiting means 64L of lower switchgear compartment 51L is shown in dashed lines and that a portion X thereof includes a gap GL positioned to allow down bar 26 to pass transversely therethrough. No such gap GL is provided for bar 28 but since bar 28 is up, bar 28 can pass transversely over the stationary inhibiting means 64L. Referring now to FIG. 4, note that in the upper switchgear compartment 51U, a gap GU is positioned to allow down bar 28 to pass transversely therethrough. As in FIG. 3, there is no need for a gap GU for up bar 26. It is important to appreciate that, if an operator were to attempt to insert the ground and test apparatus 10 in the lower switchgear compartment 51L, as in FIG. 1, with the operating lever 25 "UP" and the movable housing inhibiting means 30 in the position shown in FIG. 4, the down bar 28 would physically engage the stationary switchgear inhibiting means 64L (see FIG. 3). This physical engagement would prevent full insertion of the ground and test apparatus 10 into the lower switchgear compartment 51L. Such prevention is highly desirable as the indicia means 24 would be indicating the contact position in the wrong switchgear compartment. Similarly, if an operator were to attempt to insert the ground and test apparatus 10 in the upper switchgear compartment 51U, with the operating lever 25 "DOWN", and the movable housing inhibiting means 30 in the position shown in FIG. 3, the bar 26 would be in down position and would physically engage the stationary switchgear inhibiting means 64U (see FIG. 4).

Thus, the movable inhibiting means 30 of the ground and test apparatus 10 and the stationary switchgear inhibiting means 64L, 64U coact to reduce the likelihood that the ground and test apparatus 10 will be fully inserted into a switchgear compartment other than the one visually indicated by the indicia means 24.

Also, once the ground and test apparatus 10 is inserted into the proper switchgear compartment with the movable housing means 30 moved beyond the stationary switchgear inhibiting means 64L, 64U, the movable inhibiting means 30 is substantially blocked from attaining its other position.

Figure 5A:
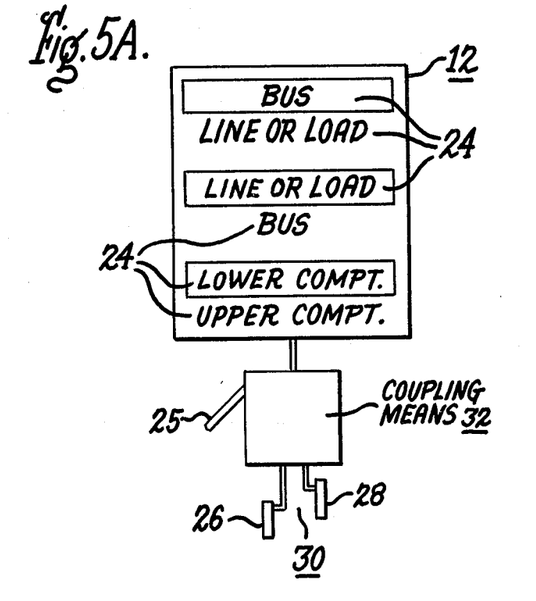
FIGS. 5A, 5B, 5C, 5D, 5E are schematic views of one form of coupling means suitable for coupling the indicia means and inhibiting means of the ground and test apparatus of FIGS. 1–4.
Figure 5B:
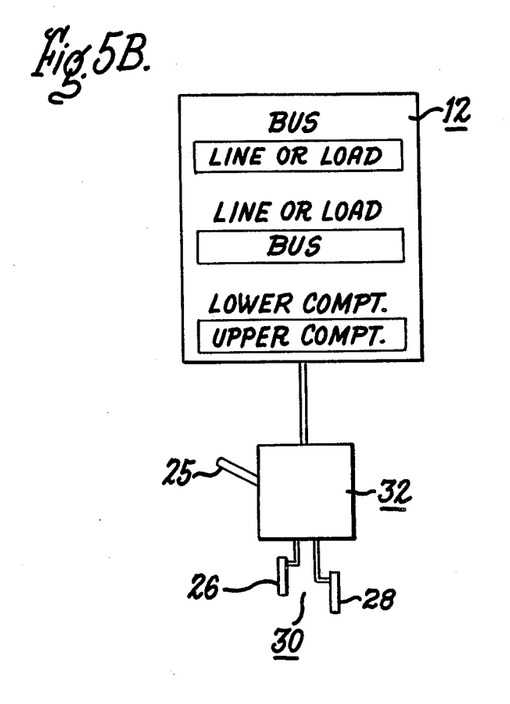

Referring now to FIGS. 5A, 5B, a preferred form of coupling means 32 for coupling the operating lever 25 to the movable housing inhibiting means 30 and to the indicia means 24 will now be discussed. Preferably, the operating lever 25 is disposed such that it is capable of achieving only two positions, e.g., "UP" and "DOWN". In FIG. 5A, the two-position operating lever 25 is shown in "DOWN" position and coupled to the indicia means 24 so that the indicia means 24 visually indicates the proper information through slots while covering the improper information. Also, the "DOWN" position of the operating lever 25 results in the movable housing inhibiting means 30 being in the position shown in FIG. 3 with bar 26 down and bar 28 up. Conversely, in FIG. 5B, the two-position operating lever 25 is shown in "UP" position so that the indicia means 24 visually indicates the proper information through the slots while covering the improper information and the movable housing inhibiting means 30 is in the position shown in FIG. 4.

Figure 5C:
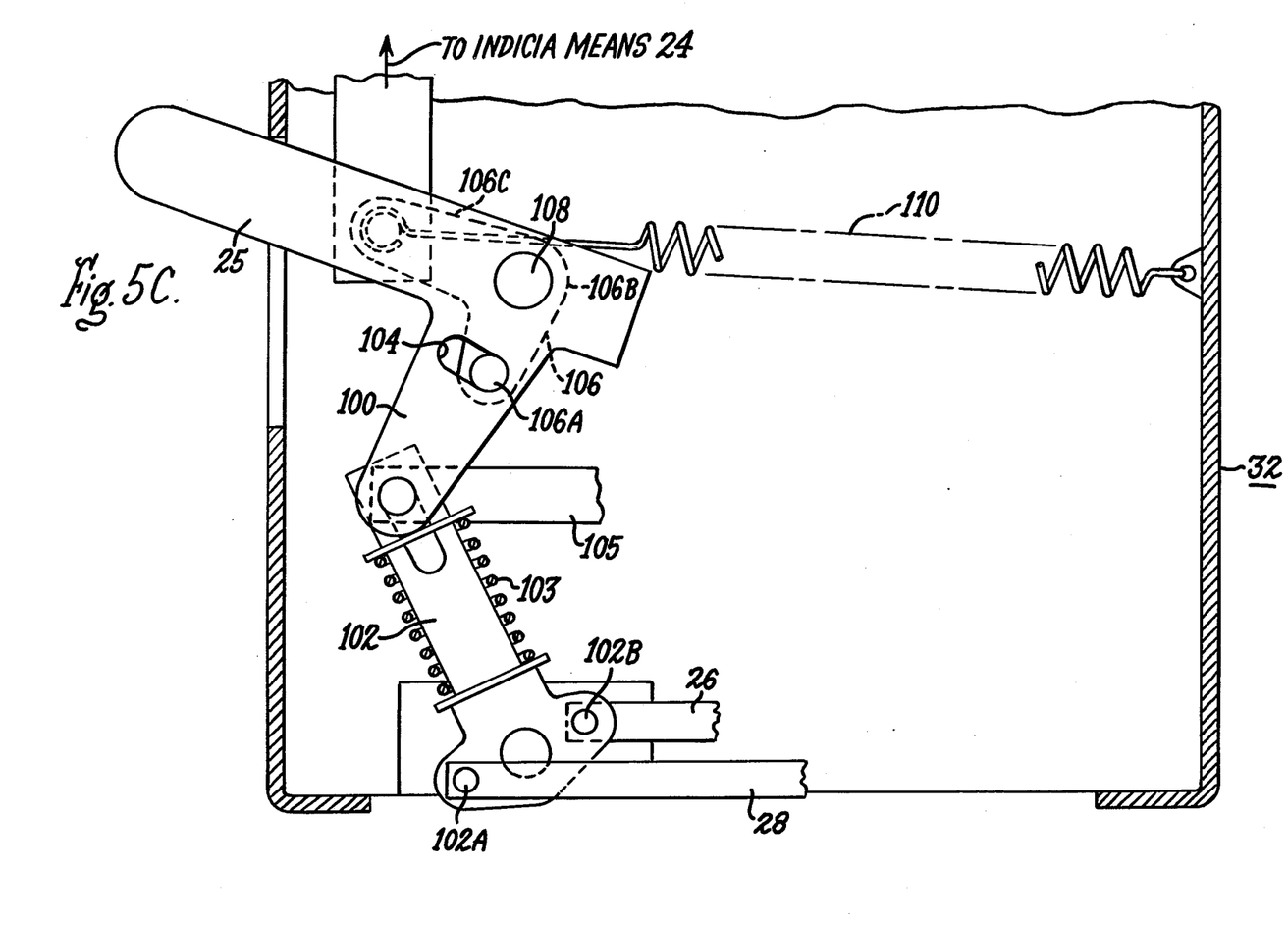
Figure 5D:
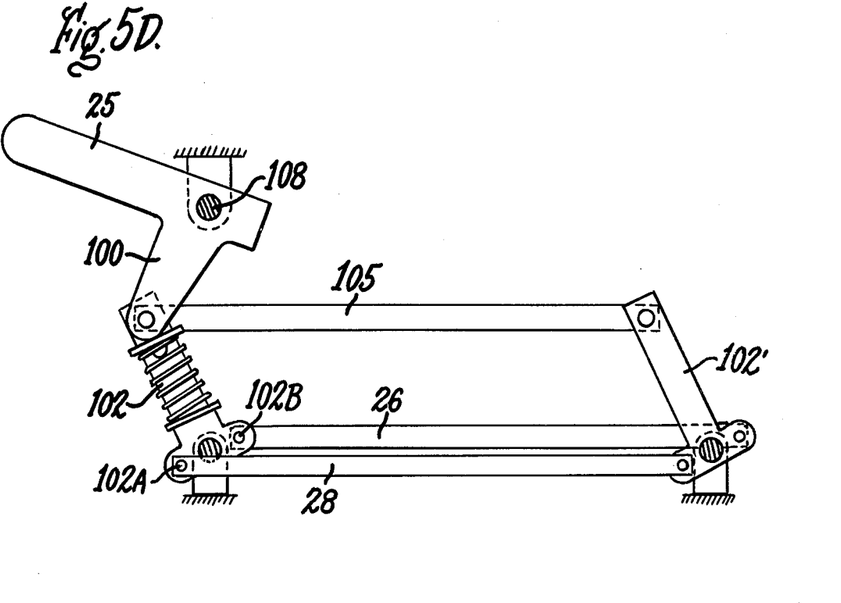
Figure 5E:
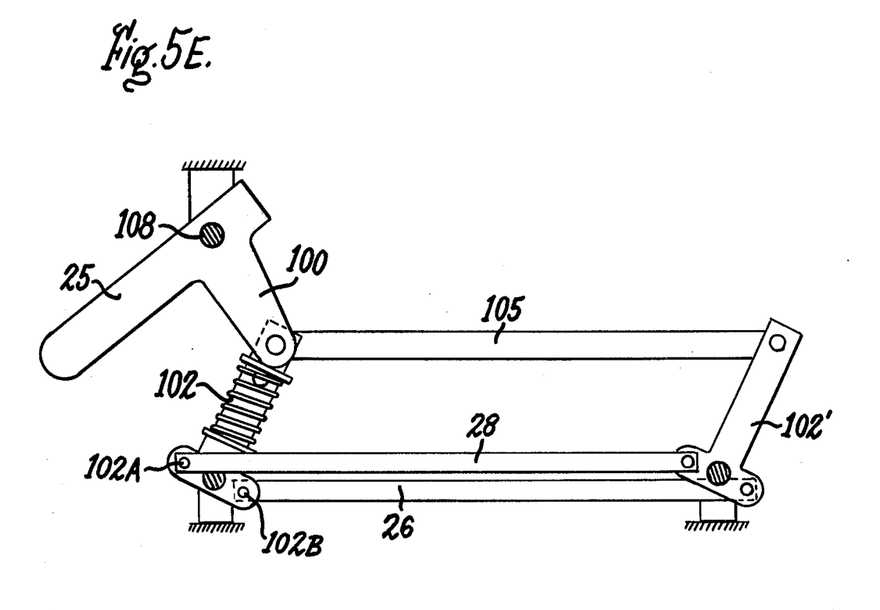

Referring now to FIG. 5C, a preferred form of coupling means 32 for coupling operating lever 25 to indicia means 24 and movable housing inhibiting means 30 is more fully depicted. Referring first to the coupling of the operating lever 25 to the movable housing inhibiting means 30, the coupling means 32 includes an upper toggle link 100 with an upper end directly coupled to the operating lever 25 in a manner such that the up-down movement of the operating lever 25 causes the lower end of the toggle link 100 to follow the arc-like path shown in FIG. 5C. The lower end of upper toggle link 100 is pivotally connected to lower member 102 which comprises a lower toggle link surrounded by an overcenter compression spring 103. Referring now to FIGS. 5C, 5D, 5E, the movable housing inhibiting means 30 is coupled pivotally at the lower end of the member 102. The front end of bars 26 and 28 are raised and lowered by pins 102A and 102B in the lower end of member 102. A connecting link 105 extends to the rear from the midpoint of toggle 100, 102 to a member 102' similar to toggle member 102. Pins in the member 102' raise and lower the rear of bars 26 and 28 in a similar manner to pins 102A and 102B thus keeping the bars 26, 28 essentially horizontal throughout their movement.

Referring now to the coupling of the operating lever 25 to the indicia means 24, preferably, a lost motion coupling is provided so that the indicia means 24 is not directly operated by the operating lever 25. A purpose of the lost motion coupling is to permit the operating lever 25 to be moved to provide clearance, if necessary, between the lower side of the movable housing inhibiting means bars 26, 28 and the stationary switchgear inhibiting means 64L, 64U without moving the information visually indicated on the indicia means 24. Also, the lost motion connection reduces the likelihood that the indicia means 24 can be left in an intermediate position which might otherwise occur if the coupling were direct and the operating lever 25 was moved half way and left in that position, being held there by friction.

Referring now again to FIG. 5C, in order to provide such a lost motion connection, the upper toggle link 100 is provided with a slot 104 and a portion 106A of a lost motion link 106 is connected thereto. A central portion 106B of the lost motion link 106 is pivotally connected to a shaft 108. The operating lever 25 also rotates pivotally about the shaft 108. Another portion 106C of the lost motion link 106 is pivotally connected to the indicia means 24. An overcenter spring 110 is provided to prevent maintenance in an intermediate position of the indicia means 24. The overcenter spring 110 cooperates with the overcenter compression spring 103 such that there is always one of these springs 103, 110 in a position other than dead-center. This cooperation ensures that unbalanced spring forces are present to reduce the likelihood of frictional forces causing an intermediate position of the indicia means 24 to appear. In the embodiment depicted in FIG. 5C, the lost motion link 106 delays the movement of overcenter spring 110 in relation to the movement of overcenter spring 103 so that when overcenter spring 110 is at a dead-center position, overcenter spring 103 is beyond center and functions to urge overcenter spring 110 beyond center.

Figure 6:
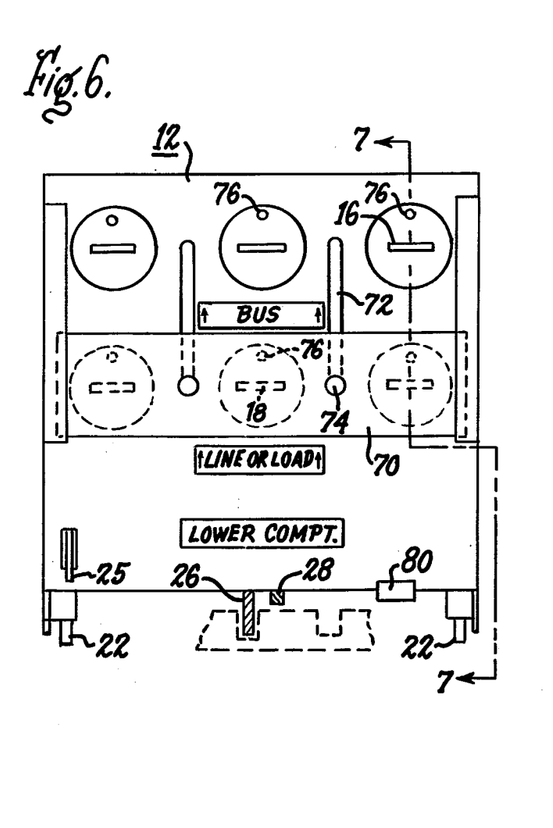
FIG. 6 is a front elevational view, taken as in FIGS. 3, 4, showing another form of the ground and test apparatus of the present invention.
Figure 7:
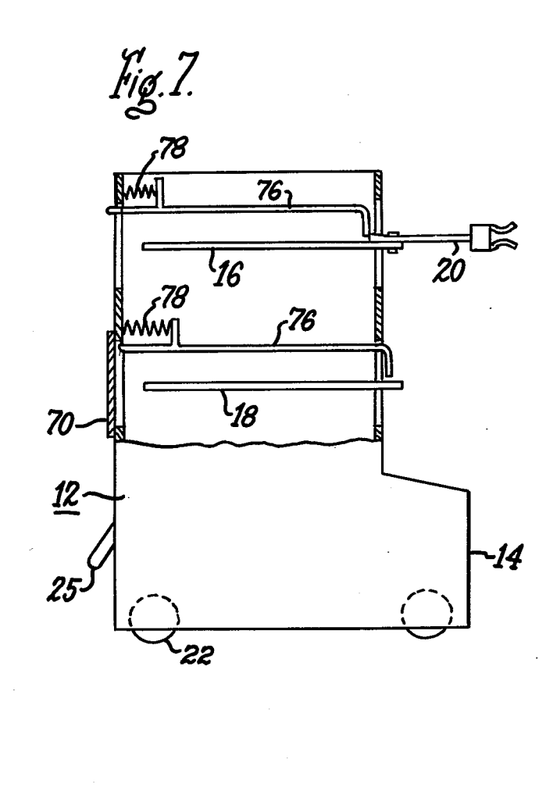
FIG. 7 is a partially sectioned side elevational view taken along line 7—7 of FIG. 6.

Another form of ground and test apparatus of the present invention is partially shown in FIGS. 6, 7. For purposes of clarity, wherever possible, like reference numbers have been employed to designate like elements. One additional feature of the ground and test apparatus of FIG. 6 is the inclusion of a shutter 70 for covering housing conductors which are not connected, or not intended to be connected, for a particular test to switchgear contacts. For example, in FIG. 6, the shutter 70 is shown covering the line or load side switchgear contacts in the lower switchgear compartments. The shutter 70 is preferably removably secured to the front side 12 of the housing through fastening means 74, e.g., screws, inserted into vertical slots 72. It is desirable to locate such screws on the rear of the front side 12 so that they are inaccessible to an operator when the ground and test apparatus 10 is in the appropriate switchgear compartment. In this way, the now-covered housing conductors cannot be uncovered unless the ground and test apparatus 10 is removed from the switchgear compartment.

Another additional feature of the ground and test apparatus of FIG. 6 is the provision of indicating rods 76. The indicating rods 76 are coupled through biasing spring means 78 to the housing conductors at the rear side 14 in such a manner that, when a connection bar 20 is connected to the housing conductor at the rear end of the housing, e.g., conductor 16, the indicating rod 76 is caused to move forward and out of the front side 12. This condition visually indicates that housing conductor 16 includes a connection bar 20 secured thereto and will be electrically connected to the appropriate switchgear contact. If desired, the shutter 70 and indicating rod, or rods 76, can be employed cooperatively wherein the shutter 70 can only be employed to cover those housing conductors which do not include connection bars 20 attached thereto. Such cooperation is shown in FIG. 7 where indicator rod 76 extends a sufficient distance out of the front side 12 so as to prevent shutter 70 from covering housing conductor 16. This cooperative function between shutter 70 and indicator rod(s) 76 is desirable so that an operator does not inadvertently cover housing conductors having connection bars attached and then connect grounding cables to the set of housing conductors which have no connection bars attached.

Although the ground and test apparatus of the present invention has been described in connection with inhibiting means in which the stationary inhibiting means of the switchgear compartments preferably also functions as a rating interference means, the stationary inhibiting means of the switchgear compartments may be a separate structure. Also, the particular location of the ground and test apparatus movable inhibiting means and the switchgear stationary inhibiting means is not critical as long as these coacting inhibiting means are disposed to properly engage each other upon insertion of the ground and test apparatus into the appropriate switchgear compartment. Further, although preferred specific forms of inhibiting means and mechanical linkages have been disclosed, my invention in its broader aspects contemplates the use of other similar forms of inhibiting means and linkages.

While I have illustrated a preferred embodiment of my invention by way of illustration, many modifications will occur to those skilled in the art and I therefore wish to have it understood that I intend in the appended claims to cover all such modifications as fall within the true spirit and scope of my invention.

What is claimed as new and desired to be secured by Letters Patent of the United States is:

1. A ground and test apparatus in combination with switchgear apparatus wherein the switchgear apparatus includes an upper circuit breaker compartment and a lower circuit breaker compartment, each of the compartments including at least one pair of vertically spaced-apart electrical switchgear contacts, one of the pair of switchgear contacts comprising a bus-side contact and the other of the pair of contacts comprising a line or load side contact, the pairs of switchgear contacts in the upper and lower compartments being substantially identically disposed along a common vertical axis except the relative vertical position of the bus-side contact and the line or load side contact in the upper and lower compartments is reversed, wherein the combination comprises:

(a) a housing having spaced-apart front and rear sides and being of a configuration suitable for insertion into said upper or lower compartments of said switchgear apparatus with said rear side facing said pair of electrical contacts of said upper or lower compartments of said switchgear apparatus;

(b) at least one pair of vertically spaced-apart housing electrical conductors extending at least partially between said front and rear sides of said housing, said pair of housing conductors being spaced-apart in substantially the same manner as said spaced-apart electrical switchgear contacts of said switchgear apparatus, at least one member of said pair of housing conductors at said rear side of said housing being adapted so that when said housing is fully inserted into one of said compartments, said conductor is electrically connected to a predetermined member of said pair of switchgear contacts of said upper or lower compartment of said switchgear apparatus and said one member of said pair of housing conductors is physically accessible for connection to ground at said front side of said housing;

(c) indicia means located on said front side of said housing for visually indicating the proper relative vertical location of said bus-side and line or load side electrical switchgear contacts in said upper or lower compartments; and (d) inhibiting means coupled to said indicia means for physically inhibiting the full insertion of said housing into said upper or lower compartments when said indicia means visually indicates an improper relative vertical location of said bus-side and line or load side electrical switchgear contacts in said upper and lower compartments, said inhibiting means permitting the full insertion of said housing into said upper or lower compartments when said indicia means visually indicates the proper relative vertical location of said bus-side and line or load side electrical switchgear contacts.

2. The combination of claim 1 wherein each of the compartments including three horizontally spaced pairs of said vertically spaced-apart switchgear electrical contacts with one similarly disposed member of each of said three pairs comprising a bus-side switchgear contact and the other member of each of said three pairs comprising a line or load side switchgear contact, said housing including three horizontally spaced pairs of said vertically spaced-apart housing eletrical conductors disposed in substantially the same manner as said three pairs of switchgear contacts of each of said upper and lower compartments, at least one member of each of said three pair of housing conductors at said rear side of said housing being adapted so that when said housing is inserted into one of said compartments, each of said member of said housing conductors is respectively electrically connected to a predetermined member of each one of said three pairs of switchgear contacts of said switchgear apparatus and said one housing conductor member of each of said three pairs of housing conductors is physically accessible for connection to ground at said front side of said housing.

3. The combination in accordance with claim 1 in which said indicia means includes means for visually indicating upper or lower compartment.

4. The combination in accordance with claim 2 in which said inhibiting means includes movable housing inhibiting means for coacting with stationary switchgear inhibiting means, said movable housing inhibiting means being capable of attaining two operating positions, one of said operating positions allowing said housing to be fully inserted into said upper switchgear compartment when said indicia means properly indicates the relative position of said bus side and said line or load side switchgear contacts in said upper switchgear compartment with said one operating position of said movable housing inhibiting means engaging said switchgear stationary inhibiting means and inhibiting the full insertion of said housing into said lower switchgear compartment when said indicia improperly indicates the relative position of said bus side and line or load side switchgear contacts in said lower switchgear compartment, and, the other of said two operating positions allowing said housing to be fully inserted into said lower switchgear compartment when said indicia means properly indicates the relative position of said bus side and line or load side switchgear contacts in said lower switchgear compartment with said other operating position of said movable housing inhibiting means engaging said switchgear stationary inhibiting means and inhibiting the full insertion of said housing into said upper switchgear compartment when said indicia means improperly indicates the relative position of said bus side and line or load side switchgear contacts in said upper switchgear compartment.

5. The combination in accordance with claim 4 in which when said ground and test apparatus is inserted into one of said switchgear compartments so that said movable housing inhibiting means has moved beyond said stationary switchgear inhibiting means, with said movable inhibiting means in one of said two operating positions and said indicia means properly indicating the relative position of said switchgear bus side and line or load side contacts, said movable inhibiting means is substantially blocked from attaining said other operating position.

6. The combination in accordance with claim 5 in which said housing conductors include indicator bars coupled thereto, said indicator bars being spring biased in relation to said housing conductors so that when a connection bar is removably secured to said housing conductor at the rear side of said housing, said indicator bar is caused to move toward the front side of said housing thereby indicating that said housing conductor includes a removable connection bar secured at the rear end thereof.

7. The combination in accordance with claim 6 which includes a shutter for covering said housing conductors which are not connected to said switchgear contacts and in which said shutter is prevented by said indicator rods from covering any of said housing conductors which have said connection bar secured thereto.

8. The combination in accordance with claim 5, in which said upper switchgear compartment includes switchgear line or load side contacts on top and switchgear bus side contacts on bottom and said lower switchgear compartment includes switchgear bus contacts on top and switchgear line or load contacts on bottom wherein said indicia means is adapted to properly indicate the location of said bus and line or load contacts of said upper and lower switchgear compartment.

9. The combination in accordance with claim 4 in which an operating lever is coupled to said movable housing inhibiting means and to said indicia means through coupling means, which comprises:
   lost motion coupling means coupling said operating lever to said indicia means so that said indicia means is not directly operated by said operating lever, and
   spring biasing means cooperating with said lost motion coupling means to prevent maintenance in intermediate positions of said indicia means.

10. The combination in accordance with claim 9 in which said movable housing inhibiting means comprises:
   a pair of bars disposed generally parallel with said housing conductors, said bars being disposed so that when one bar is retracted, the other bar is extended, said pair of bars being coupled to said operating lever through said coupling means.

11. The combination in accordance with claim 9 in which said stationary switchgear inhibiting means further comprises a rating interference plate.

* * * * *